Figure 1:
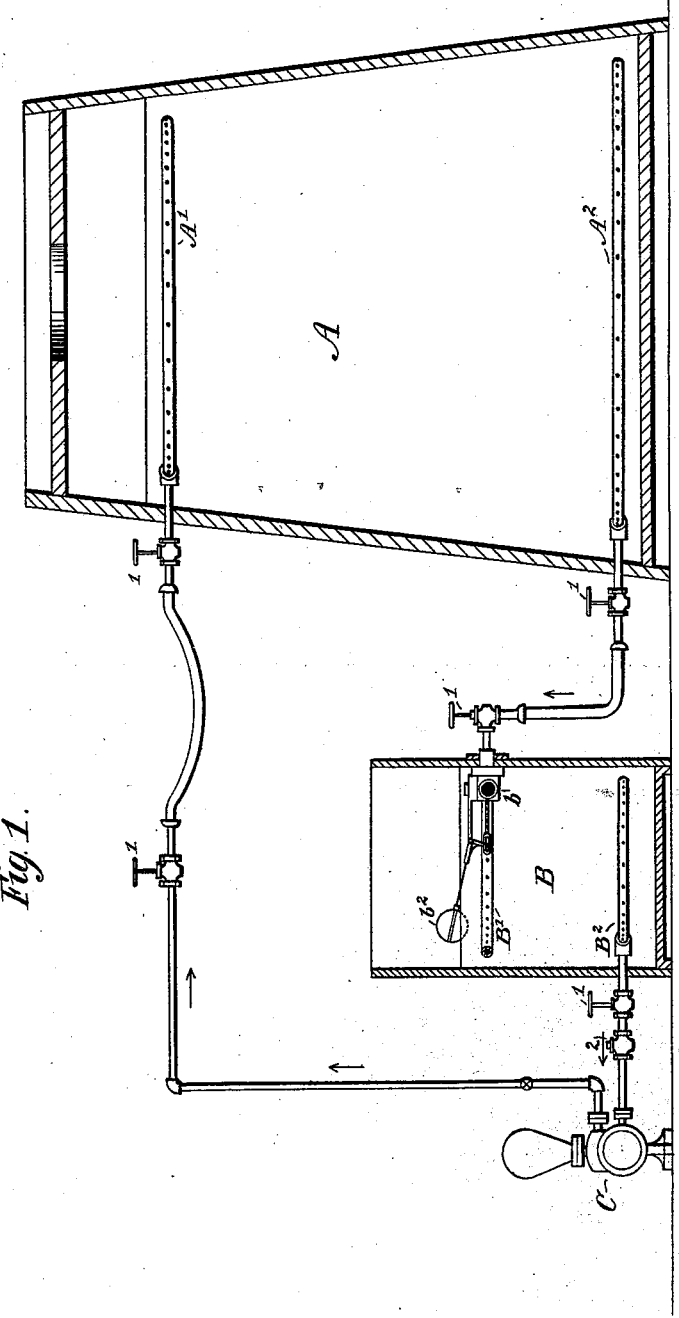

(No Model.) 3 Sheets—Sheet 1.
M. WARREN.
METHOD OF AND APPARATUS FOR MAKING CERTAIN FERMENTED BEVERAGES.

No. 510,219. Patented Dec. 5, 1893.

WITNESSES:
C. C. Miller
D. A. Carpenter

INVENTOR
Marion Warren
BY
Murphey & Metcalf
ATTORNEYS

THE NATIONAL LITHOGRAPHING COMPANY,
WASHINGTON, D. C.

(No Model.) 3 Sheets—Sheet 2.
M. WARREN.
METHOD OF AND APPARATUS FOR MAKING CERTAIN FERMENTED BEVERAGES.
No. 510,219. Patented Dec. 5, 1893.
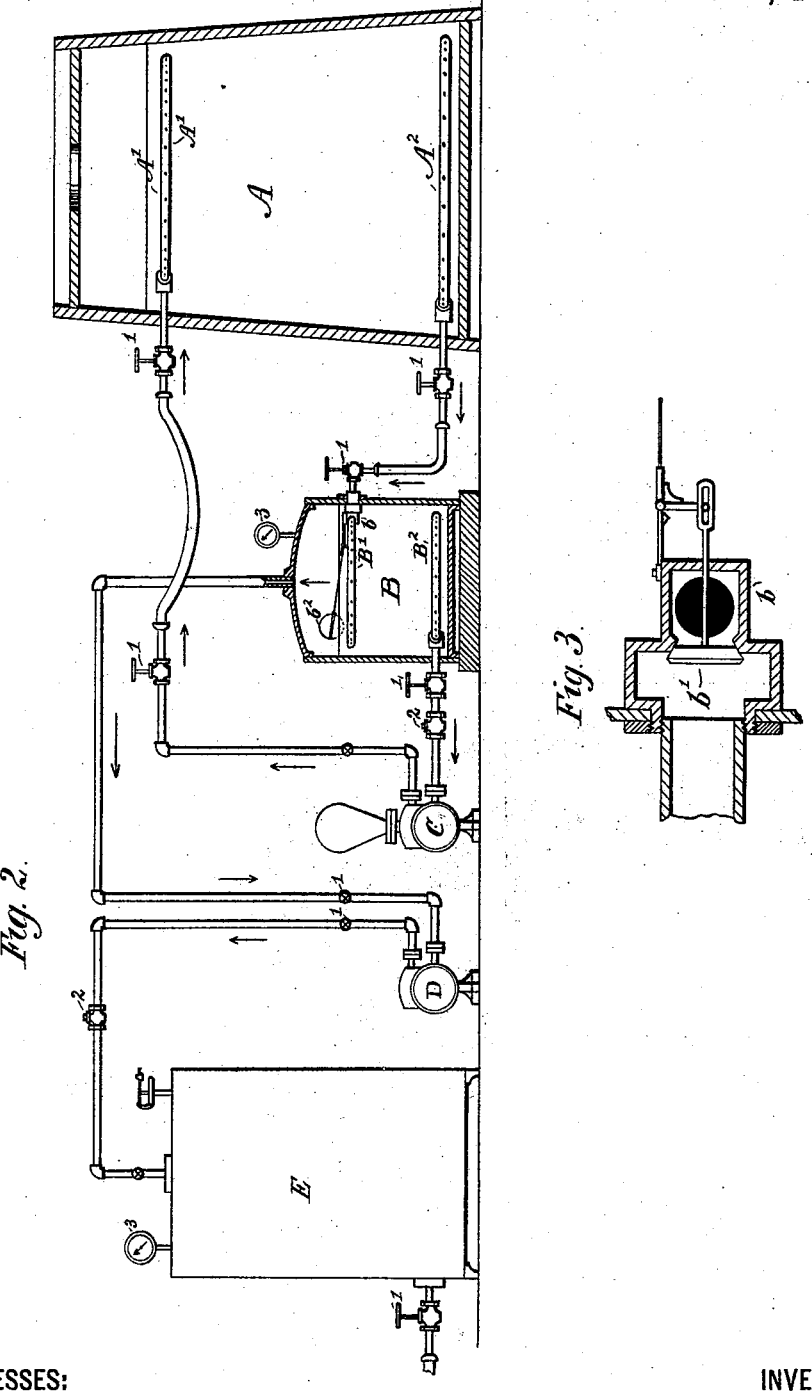
WITNESSES:
C. C. Miller
D. A. Carpenter
INVENTOR
Marion Warren
BY
Murphey & Metcalf
ATTORNEYS.

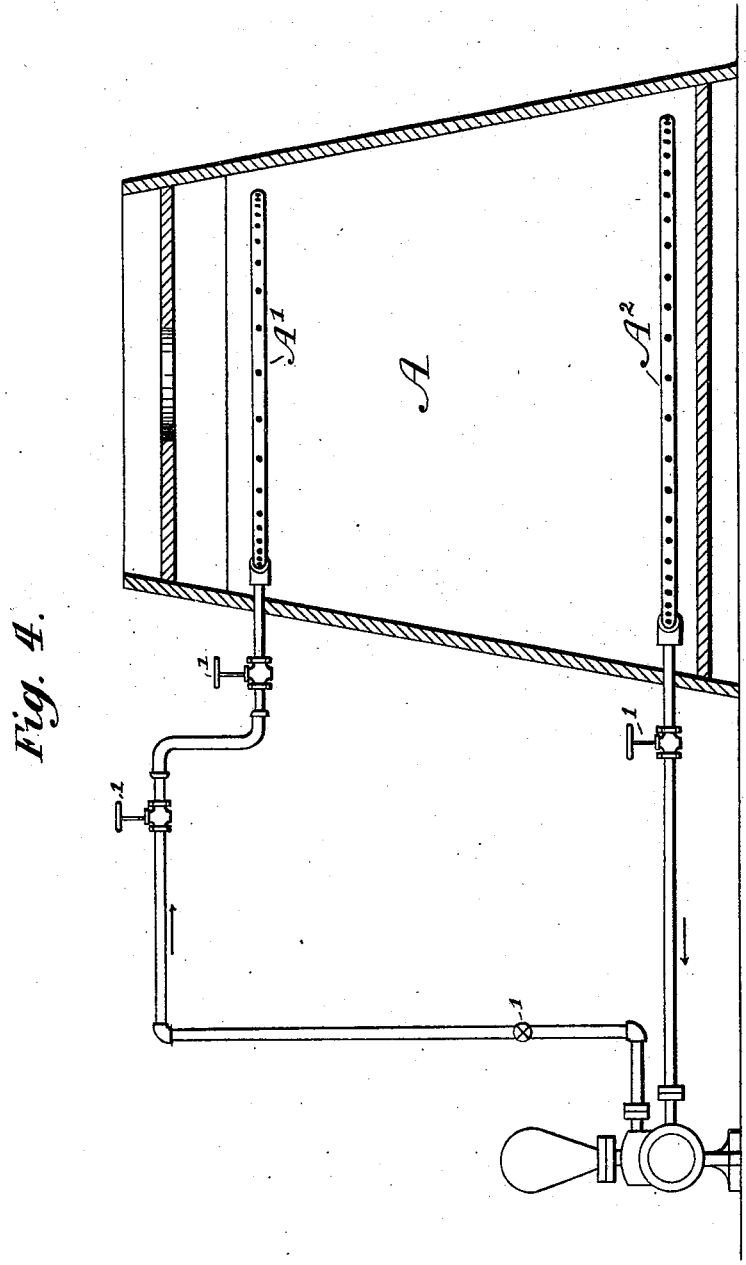

UNITED STATES PATENT OFFICE.

MARION WARREN, OF NEW YORK, N. Y.

METHOD OF AND APPARATUS FOR MAKING CERTAIN FERMENTED BEVERAGES.

SPECIFICATION forming part of Letters Patent No. 510,219, dated December 5, 1893.

Application filed March 31, 1893. Serial No. 468,549. (No model.)

*To all whom it may concern:*

Be it known that I, MARION WARREN, a citizen of the United States, and a resident of the city, county, and State of New York, have invented certain new and useful Improvements in Methods of and Apparatus for Making Certain Fermented Beverages, of which the following is a full, clear, and exact description, reference being had to the accompanying drawings, forming part of this specification.

My invention relates to the manufacture of lager beer and other fermented beverages of similar character, which after the violence of the first or main fermentation has subsided are usually transferred from the tuns or vats in which such fermentation is carried on to large vessels or casks, usually open at the top in order that the carbonic acid gas which still rises slowly therefrom may pass off. This period of very mild fermentation is commonly known as the "ruh" period, and the vessels or casks to which the beer is transferred from the fermenting tuns are termed "ruh" casks. During the ruh period fermentation proceeds very slowly; but the beer or other beverage will not have attained the requisite quality of ripeness until the rising of the gas substantially ceases. In order therefore that the beer may be properly matured for consumption it has, as the art of brewing has heretofore been practiced, been necessary to hold the beer in the ruh casks for long periods, sometimes for many months; and as the temperature of the cellars in which this operation is conducted must be low and practically uniform, the carrying of the beer through the ruh stage has been the most onerous and expensive step in its manufacture. In consequence the brewer's constant endeavor has been to shorten the "ruh" period without causing any deterioration in the quality of the beer. The "ruh" casks previously mentioned are very large, sometimes holding several thousand gallons each, and one reason why the beer frees itself so slowly from the carbonic acid gas during the "ruh" period is because of the height of the liquid in the casks, which exerts on that portion of it which is much below the surface a hydrostatic pressure amounting at the bottom of the cask to several pounds, and this pressure, by preventing the rapid rising of the gas retards its liberation and the maturing of the beer.

The object of my invention is to relieve the beverage from this undue pressure, and thus shorten the period now required for the proper maturing of the beverage by facilitating the liberation of the carbonic acid gas therefrom. The desirability of relieving the beer from pressure during the "ruh" period for this purpose has been recognized by brewers for several years, and in fact a process which is now used to a considerable extent is based on this principle. In that process the beer is confined during the entire "ruh" period in closed tanks, and the atmospheric air and the rising carbonic acid gas are constantly drawn off from the top of the tank by means of a vacuum pump. The diminution of pressure on the surface of the liquid due to the partial removal of the atmospheric pressure materially facilitates the rising of the corbonic acid gas, and proportionately shortens the time required to mature the beer. But even where this process is employed there still remains the hydrostatic pressure of the beer in the cask—that is to say, there is still the same difference of pressure between the top and the bottom of the cask, and the beer at the top of the cask is ready for the chip casks long before that at the bottom of the cask is sufficiently matured.

In my improved process I also with advantage employ a vacuum or partial vacuum to accelerate the ripening of the beer; but my process does not depend upon the employment of a vacuum, and even where it is employed, my process is to be clearly distinguished from that which I have just described, because I do not confine the beer in a closed vessel during the entire "ruh" period, and there constantly subject it to the action of a vacuum or partial vacuum. On the contrary, by my improved process, the beer, after having undergone the main fermentation, is placed in an open vessel, such as the "ruh" casks now generally employed, and is then removed from the lower part of the vessel, where the hydrostatic pressure is excessive, and returned to the vessel at a point nearer the surface of the liquid, the circulation being gently maintained, either intermittently or continuously, until the beer or other beverage is sufficiently treated.

In transferring the beer from the lower to the upper portion of the cask, I prefer to pass it through an intermediate vessel which may be of small size, and which may be either open to the atmosphere, or in which a partial vacuum may be maintained. But whether such intermediate vessel is employed, or whether it is open to the atmosphere or not, the beer so transferred is effectively relieved from the hydrostatic pressure of the liquid in the first mentioned vessel. Preferably I close the intermediate vessel to the atmosphere and maintain a partial vacuum therein, as set forth. Where the intermediate vessel is employed, I deem it advisable to so establish and maintain the circulation of the beer between the two vessels that it will be taken from the lower part of the first vessel, where the hydrostatic pressure is greatest, and delivered into the second vessel at or near the surface of the liquid, where the hydrostatic pressure is substantially negligible. By thus accelerating the liberation of the carbonic acid gas by relieving the beer from the pressure due to its own weight in the "ruh" cask, or (where a partial vacuum is employed) to its weight and the pressure of the atmosphere, the beer will be properly matured in a much shorter period of time than is possible with the most approved processes heretofore employed.

The operations above described are necessarily conducted in a cool atmosphere such as is ordinarily employed in the finishing cellars. This usually varies with the individual practice and preferences of different brew masters between 30° and 55° Fahrenheit, and by the term "cool atmosphere" I intend to designate an atmosphere of which the temperature is somewhere between 28° and 60° Fahrenheit.

In the accompanying drawings, Figure 1 is a view in elevation (partly in section) of an apparatus for carrying my invention into effect. Fig. 2 is a similar view of an apparatus therefor. Fig. 3 is a detail sectional view of the float valve for controlling the flow of the liquid from one vessel to the other, and Fig. 4 is a view in elevation (partly in section) of an apparatus in which the intermediate vessel B is dispensed with.

In said drawings, A is a vessel which is usually open at the top, and which may be similar to the ordinary "ruh" casks at present employed in most breweries. These casks are usually very large, holding sometimes several hundred barrels. In the upper part of the vessel A is suspended a perforated pipe A', and a similar pipe $A^2$ is suspended in the lower part of said vessel. In the simplest form of apparatus shown (Fig. 4) the pipe $A^2$ is connected by suitable pipes, valves and fittings with the induction orifice of a pump or other equivalent mechanism for starting and maintaining the circulation, and the discharge orifice of the pump is likewise connected with the pipe A', so that by starting the pump, the beer will be drawn from the bottom of the vessel A and returned thereto just below the surface of the liquid.

Where the intermediate vessel B is employed (Figs. 1 and 2) the pipe $A^2$ is connected by suitable fittings, valves, pipes or tubing with the perforated pipe B' suspended in the vessel B. The vessel B, in that form of apparatus shown in Fig. 1, is open to the atmosphere. In the lower part of the vessel B is suspended a perforated pipe $B^2$, which by means of suitable pipes and fittings is connected with the induction orifice of the pump C. The discharge orifice of the pump C is connected with the perforated pipe A' in the vessel A. The perforated pipes A', $A^2$ and $B^2$ are preferably bent into circular form and each end thereof is screwed into a T into which the external connecting pipes are also screwed. The ends of the pipe B' are however fitted into a valve body $b$, in which is placed a valve $b'$ operated by a float $b^2$ so as to automatically control the flow of liquid from the vessel A to the vessel B. In that arrangement of apparatus which is shown in Fig. 2, the vessel B, instead of being open, is closed to the atmosphere, and the top or upper part of the vessel is connected above the liquid level with the induction chamber of an air or vacuum pump D, and the eduction chamber of said pump is connected with a gas storage tank E. Suitable valves 1, check valves 2, and gages 3 are provided, but they require no special description, and many obvious modifications in the form of the apparatus employed will suggest themselves to the practical brewmaster, or his assistants; but these modifications, as they involve no departure from my invention, also require no specific description.

Referring now to the arrangement of apparatus shown in Fig. 1, the vessel A, which may occupy the same position in the brewery which the "ruh" casks now occupy, and which in fact may be an ordinary "ruh" cask, having the pipes B', $B^2$ and fittings attached, is filled with the beer or other beverage in the proper condition, to wit: preferably in that condition in which it usually is when transferred to the "ruh" casks. As the vessel A is filled, the intermediate valves being open, when the beer reaches the proper level it will flow into the vessel B through pipes $A^2$, B', valve $b'$ and connections, until it attains the level at which the valve $b'$ is set to close, when no more of the beer will flow into the vessel B, but it will continue to rise in the vessel A until it is sufficiently filled when, the vessels being charged, the supply is shut off. The pump C is then started very slowly, and the beer is drawn off from the bottom of the vessel B and gently discharged in the form of a fine spray or series of jets into the upper part of the vessel A below the surface of the liquid through the perforations in pipe A'. As the beer is drawn out of the vessel B, the float $b^2$ will descend, opening the valve $b'$ slightly, and permitting the beer to flow from the bottom of the vessel A through the pipes $A^2$ $B'$ into the upper part of the vessel B. A gentle and substantially continuous circulation is thus maintained back and forth between the two vessels, and the beer is taken from the bottom of vessel A, where the pressure on it is greatest, and transferred to the top of vessel B, where there is substantially no hydrostatic pressure.

The process above described may be modified and accelerated by subjecting the beer in vessel B to the action of a partial vacuum, which I accomplish by employing the apparatus shown in Fig. 2, in which the vessel B, instead of being open at the top, is closed to the atmosphere, and the upper part thereof is connected with a vacuum pump by which a partial vacuum (preferably up to about eighteen inches of mercury), is maintained above the beer in vessel B. As the beer flows into the vessel B, the carbonic acid gas rising therefrom is drawn out of the vessel B by the pump D and forced into the gas storage tank E under pressure, whence it may be drawn for use in charging and finishing the beer in the "chip" casks, or for other purposes. The beer pump may be so regulated that the flow of the beer between the vessels shall be substantially continuous. I prefer that the flow of the liquid should be very gentle, so as to avoid agitating it unduly, and also in order that the beer, as it flows into the vessel B, may have ample time to yield up as large a proportion as possible of its surplus carbonic acid gas before being drawn to the bottom of the vessel. As stated, I also prefer to constantly maintain in the vessel B a rarefied atmosphere equivalent to about eighteen inches of mercury or less; but this may be exceeded without detriment when the utmost possible saving of time is required.

The time required for the proper treatment of the beer will of course depend, among other things, on its previous condition, on the temperature of the cellar in which it is treated, and on the rapidity with which the circulation is maintained; but these varying conditions are well understood, and will be allowed for by the experienced brewmaster, who, by testing the beer, can readily determine, in the same manner as at present, when it has attained the proper condition.

After the beer is sufficiently treated by my process, it is ready to be carbonated with its own carbonic acid gas, or transferred to the "chip" or "shavings" casks, and there finished for the market in the usual way.

Besides enabling the brewer to prepare his beer for the market in much less time than by any practical method heretofore used, my process may be put into use without requiring him to put in an entirely new plant. The "ruh" casks at present generally used may be utilized at a small expenditure for pipe and fittings, and even when the intermediate vessel B is employed, it is comparatively small and consequently inexpensive, so that a very small outlay is needed in order to put my invention into use.

The exact period in the manufacture of the beer at which my process is to be applied may be varied considerably. I have stated that it is to be applied after the violence of the main fermentation has subsided, and this expression is to be understood as meaning that the application of my process may be advantageously commenced as soon as the beer is in that condition in which it is when, under the ordinary practiced methods of brewing, it is ready to be transferred to the "ruh" casks; but I do not mean to be understood as claiming that my process may not be applied until the main fermentation is entirely completed, or that its application must be commenced the instant the beer is ready for the "ruh" casks, since, as in all operations in the art of brewing, varying exigencies and conditions must be allowed for by the skillful brewmaster.

Having thus described my invention, what I claim as new, and desire to secure by Letters Patent, is—

1. In the manufacture of beer and beverages of like character, the herein described process of accelerating the ripening of the beverage which consists in placing it, after the violence of the main fermentation has subsided, in a vessel which is surrounded by a cool atmosphere, drawing said beverage from the lower portion of said vessel and returning it thereto at a point nearer the surface of the liquid, and continuing the operation until the beverage is sufficiently treated, substantially as shown and described.

2. In the manufacture of beer and beverages of like character, the herein described process of accelerating the ripening of the beverage which consists in placing it, after the violence of the main fermentation has subsided, in a vessel which is surrounded by a cool atmosphere, passing it from said vessel to a vessel also surrounded by a cool atmosphere, and in which it is subjected to a diminished pressure, and repeatedly circulating said beverage between said vessels, substantially as shown and described.

3. The herein described process of treating beer and beverages of like character which consists in placing the beverage, after the violence of the main fermentation has subsided, in a vessel which is surrounded by a cool atmosphere, passing it from said vessel into a vessel also surrounded by a cool atmosphere, and in which it is subjected to a diminished hydrostatic pressure, and circulating said beverage between said vessels until it is sufficiently treated, substantially as shown and described.

4. The herein described process of treating beer and beverages of like character which consists in placing the beverage, after the violence of the main fermentation has subsided, in a vessel which is surrounded by a cool atmosphere, drawing off said beverage from the lower portion of said vessel, passing it into a vessel which is also surrounded by a cool atmosphere, in which it is subjected to a diminished pressure, and circulating said beverage between said vessels until it is sufficiently treated, substantially as and for the purposes set forth.

5. The herein described process of treating beer and like beverages which consists in placing the beverage, after the violence of the main fermentation has subsided, in a vessel which is surrounded by a cool atmosphere, drawing off said beverage from the lower portion of said vessel, passing it into another vessel, also surrounded by a cool atmosphere, nearer the surface of the liquid, and circulating said beverage back and forth between said vessels until it is sufficiently treated, substantially as and for the purposes set forth.

6. In the manufacture of beer and beverages of like character, the herein described process of accelerating the ripening of the beverage which consists in placing it, after the violence of the main fermentation has subsided, in a vessel which is surrounded by a cool atmosphere, passing it from said vessel into a vessel also surrounded by a cool atmosphere in which a partial vacuum is maintained, and repeatedly circulating said beverage between said vessels, substantially as shown and described.

7. The herein described process of treating beer and beverages of like character which consists in placing the beverage, after the violence of the main fermentation has subsided, in a vessel which is surrounded by a cool atmosphere, passing it from said vessel into a vessel closed to the atmosphere and also surrounded by a cool atmosphere, abstracting the atmospheric air and rising carbonic acid gas from said closed vessel, and circulating said beverage between said vessels until the beverage is sufficiently treated, substantially as shown and described.

8. The herein described process of treating beer and beverages of like character which consists in placing said beverage, after the violence of the main fermentation has subsided, in a vessel which is surrounded by a cool atmosphere, drawing said beverage from the lower portion of said vessel, passing it into a closed vessel nearer the surface of the liquid, which closed vessel is also surrounded by a cool atmosphere, abstracting the atmospheric air, and rising carbonic acid gas from said closed vessel, and circulating said beverage between said vessels until the beverage is sufficiently treated, substantially as shown and described.

9. In apparatus for the manufacture of beer, the combination of the vessel A, the vessel B closed to the atmosphere, a connection between said vessels, a pump C, a connection between the induction chamber of said pump and the vessel B, a connection between the eduction chamber of said pump and the vessel A, and a vacuum pump connected with the upper part of the vessel B, substantially as shown and described.

MARION WARREN.

Witnesses:
S. G. METCALF,
WM. W. SHAW.